Feb. 24, 1925.                                                         1,527,273
                              W. RIEHM
           DEVICE FOR HEATING OIL AND OTHER VISCOUS LIQUIDS
                           Filed Sept. 8, 1922
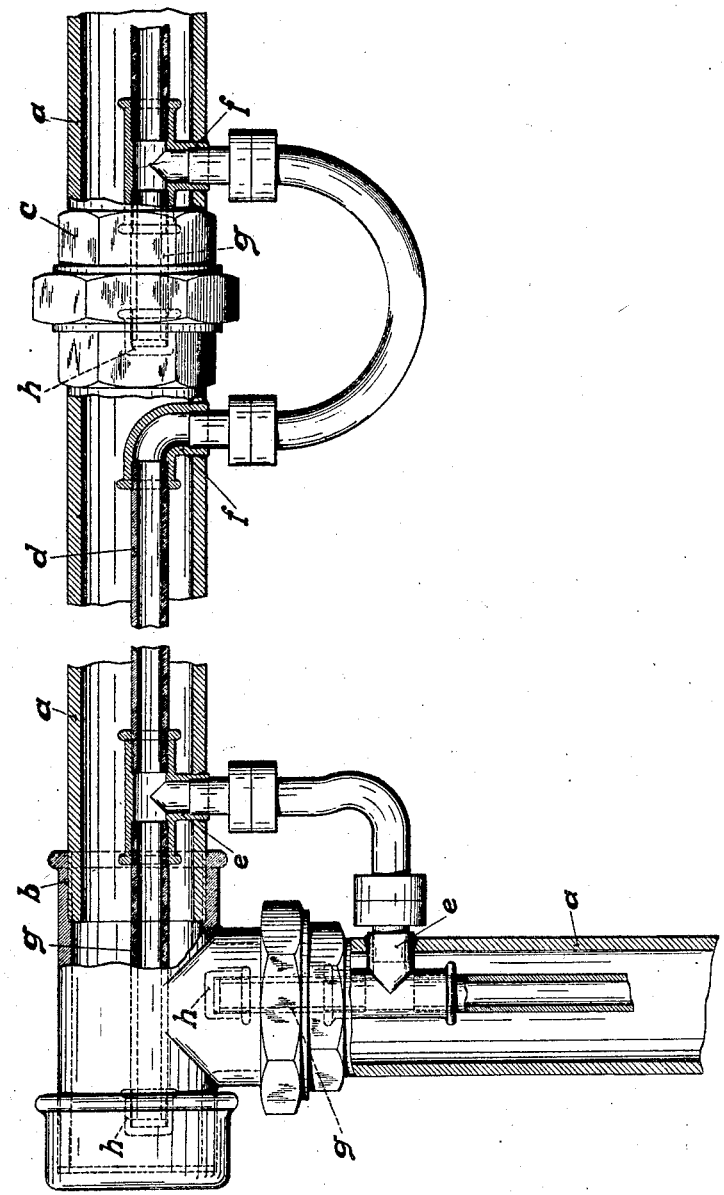

Patented Feb. 24, 1925.

1,527,273

UNITED STATES PATENT OFFICE.

WILHELM RIEHM, OF AUGSBURG, GERMANY.

DEVICE FOR HEATING OIL AND OTHER VISCOUS LIQUIDS.

Application filed September 8, 1922. Serial No. 587,035.

*To all whom it may concern:*

Be it known that I, WILHELM RIEHM, a citizen of the German Republic, residing at Augsburg, Germany, have invented certain new and useful Improvements in Devices for Heating Oil and Other Viscous Liquids, of which the following is a specification.

The utilization of oil and other viscous liquids for industrial purposes is, in many cases, only possible after these substances have been heated to assume a more liquid state. In order to avoid any appreciable loss of heat thereby such heating is, as a rule, carried out by passing the heating medium, which may be a gas or a liquid, through special pipes arranged within the oil conduits. There are, however, certain drawbacks connected with the devices used for this purpose inasmuch as the heating pipes must be carried to the outside of the oil conduits at those places where the straight course of the conduit is interrupted by bends, couplings, T-pieces or the like, and be introduced again after having bridged these places. In this way there always remain dead corners or sections within the oil conduit which are not reached by the heating pipe and at which the oil is likely to remain thick so as to partly or entirely obstruct its free passage through the system.

The main object of this invention is to eliminate this drawback and to provide a device for the said purpose which may be built up together with the heating pipes in a most economical manner from gas pipe sections including bends, T-pieces and other gas pipe fittings.

With this and other objects in view the invention consists in providing the heating pipes at places where they leave the oil conduits with a T-piece carrying a suitable extension of the gas pipe at its free end. This extension will pass into the said dead space and cause a thorough heating of the oil therein. In this way an even heating of the entire quantity of oil passing through the system is assured without having to resort to any costly special fittings for the purpose. Another advantage is the ease with which the whole system may be dismantled and re-assembled for cleaning or other purposes.

The accompanying drawing illustrates a device for the application of the invention to an oil heating conduit such as are used in connection with internal combustion engines and oil furnaces for the purpose of heating heavy fuels.

In this drawing $a$ is the oil conduit which is composed of a number of gas pipe sections joined at one place by a T-piece $b$ and by a pipe union $c$ at some other place. The pipe serving for the passage of the heating medium, for example live steam or the like, is arranged within the oil conduit and consists likewise of a number of gas pipe sections $d$ of smaller diameter and which are carried to the outside at $e$ and $f$ so as to bridge the joints. In order to heat the dead spaces formed in this way within the oil conduit, T-pieces are arranged in the steam pipe at the places where it leaves the oil conduit, from which T-pieces pipe extensions $g$ are passed into the said dead spaces. The pipe extensions are closed at their ends as by cap nuts $h$. At the places $e$ and $f$ the two pipes are preferably welded to one another.

It will be seen from the drawing that in the manner just described all parts of the oil conduit may be evenly heated so that a congestion on account of thick oil cannot take place.

What I claim is:

1. A device for heating viscous liquids, comprising in combination a liquid conduit composed of several sections, joints to unite said sections, a heating pipe within said liquid conduit leaving and re-entering same on either side of the said joints so as to form dead spaces within the liquid conduit, and separable extensions to the said heating pipe extending into the said dead spaces.

2. A device for heating viscous liquids, comprising in combination a liquid conduit composed of several sections, joints to unite said sections, a heating pipe within said liquid conduit leaving and re-entering same on either side of the joints, external heating pipe sections to bridge the joints, internal T-pieces to connect the internal heating pipe sections to the external sections, and closed extensions to the said heating pipe in connection with the said T-pieces extending into the joints of the sections of the liquid conduit.

3. A device for heating viscous liquids, a liquid conduit composed of several sections of pipe, joints to unite said sections, a heating pipe within said liquid conduit likewise composed of pipe sections and leaving and re-entering the liquid conduit at the joints, welded connections between the liquid conduit and the heating pipe at the entrance and exit places of the latter, external heating pipe sections to bridge the joints, and extensions to the said heating pipe extending into the said joints.

In testimony whereof I have hereunto set my hand, in the presence of two subscribing witnesses.

Dr. WILHELM RIEHM.

Witnesses:
 ALEXANDER DE SOTO,
 A. C. HOUGHTON.